United States Patent [19]
Tsujimoto

[11] 3,936,849
[45] Feb. 3, 1975

[54] DEVICE FOR DETECTING FOCUSSING IN OPTICAL INSTRUMENTS

[75] Inventor: Kayoshi Tsujimoto, Osaka, Japan

[73] Assignee: Minolta Camera Kabushiki Kaisha, Osaka, Japan

[22] Filed: Aug. 8, 1974

[21] Appl. No.: 495,962

[30] Foreign Application Priority Data
Aug. 9, 1973 Japan.................................. 48-89464

[52] U.S. Cl. ...................... 354/195; 354/25; 355/56
[51] Int. Cl.² ............................................ G03B 3/00
[58] Field of Search ............... 354/25, 195; 355/56

[56] References Cited
UNITED STATES PATENTS
3,543,666 12/1970 Kazel ................................... 354/25
3,713,371 1/1973 Kurihara ............................ 354/195

*Primary Examiner*—Monroe H. Hayes
*Attorney, Agent, or Firm*—Wolder & Gross

[57] ABSTRACT

A device for detecting focussing in an optical instrument such as a camera which has an objective lens and a plane, at which light sensitive film may be disposed, upon which a real image of an object is intended to be focussed. The device comprises a window to which the eye of the operator is held, and means for projecting light to the operator's eye which looks at the real image of the object formed by the objective lens. The light projected on the retina of the operator's eye is reflected back into the camera and is directed to focus-judging means in the nature of a light sensitive member which detects when the retina of the operator's eye is optically conjugate with an imaginary reference plane located in a position optically equal to a plane on which a real image of the object formed by the objective lens is intended to be focussed, thus also detecting when the position of the real image coincides with said reference plane so that the selected object is properly focussed.

14 Claims, 11 Drawing Figures

DEVICE FOR DETECTING FOCUSSING IN OPTICAL INSTRUMENTS

BACKGROUND OF THE INVENTION

The present invention relates to a device for detecting focusing in an optical instrument, such as a camera, which includes an objective lens and a plane, such as a light sensitive film, on which a real image of an object formed by the objective lens is intended to be focussed.

To automate the focussing in a photographic camera, various devices have been proposed for electrically detecting the focussing of a lens. It is usual that, in the objective field, a plurality of photographic objects, at different distances from a photographic camera, are disposed in various arrangements. However, a problem has been experienced in the use of these devices where the arrangements of various photographic objects in the objective field are complicated. Thus difficulties are encountered in detecting the proper focussing of a lens for a specific photographic object selected by the photographer from among those various photographic objects.

In U.S. Pat. No. 3,543,666, there is disclosed a means by which focus is detected through measurement of the convergance of the photographer's eyes. This however, relates to a pair of eyes of the photographer.

SUMMARY OF THE INVENTION

It is accordingly an object of the present invention to provide a device for detecting focussing in an optical instrument, which assures detection of proper focussing of an objective lens with respect to a specific photographic object, which is selected by the operator to be focussed.

It is another object of the present invention to provide a focus detecting device of simple construction relating to a single eye of the photographer.

In accordance with the operating principle of the invention herein, the real images (space image) of a plurality of photographic objects which are formed through an objective lens are focussed in positions spaced apart a different distance from the lens, depending upon the distances of respective photographic objects from the photographic camera. On the other hand, where an operator directly views those real images, his eye is naturally concentrated on the real image of the specific photographic object which the operator desires to bring into focus. Consequently, a refractive power of the crystalline lens of the operator's eye is so adjusted that the position of the real image of the aforesaid specific photographic object and the retina of the eye are optically conjugate to each other with respect to the aforesaid crystalline lens. Accordingly, if it is detected that the retina of the operator's eye and a reference plane intended to be focussed upon by the objective lens are optically conjugate to each other with respect to the crystalline lens, then the real image of the aforesaid specific photographic object will be focussed on the aforesaid reference plane, and thus the focussing of the lens with respect to the specific photographic object will be detected.

BRIEF DESCRIPTION OF THE DRAWINGS:

FIGS. 1 and 2 are diagrammatical cross-sectional views showing a first embodiment of the present invention, wherein FIG. 1 shows a condition in which a photographic object is out of focus, while FIG. 2 shows a condition in which a photographic object is properly focussed;

Figure 1:
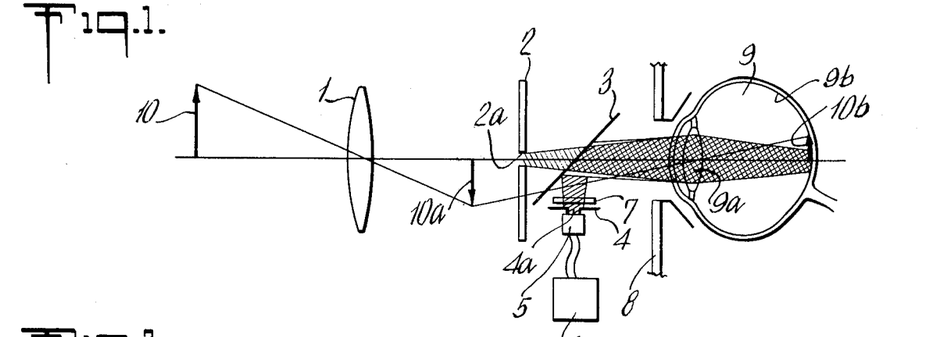
Figure 2:
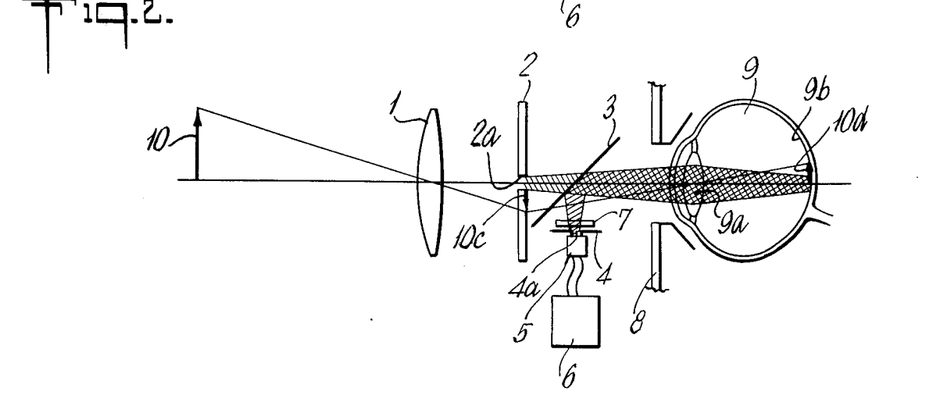

DETAILED DESCRIPTION OF THE INVENTION:

Referring in detail to the drawings, there is shown in FIGS. 1 and 2 the most simplified embodiment of the present invention. FIG. 1 illustrates a condition of such embodiment in which a photographic object being sighted is out of focus, while FIG. 2 shows a condition in which the sighted photographic object is in focus.

In FIGS. 1 and 2, there is shown the pertinent parts of an optical instrument by means of which an object may be sighted and brought into focus, the optical instrument being, for example, a photographic camera. The instrument includes an objective lens 1 which is adapted to be shifted back and forth in a horizontal direction by conventional and well known shifting mechanism (not shown), in order to bring into focus the image produced by said lens. Behind the lens 1 is a stationary filter 2, which is adapted to shield out only light in a predetermined wave length range, for example, infra red light. The filter 2 is provided with a small opening 2a centrally located therein. The opening 2a is not visible if the filter 2 has such invisible light shielding characteristic as described above.

A semi-transparent mirror 3 is mounted at an angle behind the filter 2, and beneath the mirror is mounted a light shielding plate 4 having an aperture 4a of the same configuration as the opening 2a in the filter 2. The light shielding plate 4 is disposed in such a manner that its aperture 4a has the same symmetrical linear relationship to the mirror 3 as does the opening 2a in filter 2. Mounted behind (or in this instance, beneath) the light-shielding plate 4, and in registry with the aperture 4a, is a light-sensitive member 5, which may be a photo-electric cell, for example. The light sensitive member 5 receives the light from aperture 4a, and is connected to an output circuit 6 for producing therein detecting signals as outputs.

In front of the light-shielding plate 4 is located a filter 7 for shielding out the light other than the aforesaid light of predetermined wave length range from the light falling upon the light-sensitive member 5. A viewing window 8 is located at the rear of the optical instrument through which the operator may view a real image of an object formed by the lens 1 through the mirror 3 and the filter 2, the viewing window being preferably provided with an eye-piece as shown, against which the eye 9 of the operator may rest. The crystalline lens of the operator's eye is designated as 9a, while the retina thereof is designated as 9b.

The components described above constitute a device for detecting whether or not a real image of a photographic object 10, intended to be focussed and formed through the objective lens 1, is properly focussed in the plane of the filter 2.

In operation of the detecting device, in the condition of FIG. 1 where lens 1 is not adjusted for proper focussing of the object 10, the real image of the photographic object 10 is formed through the objective lens 1 at a location 10a, which location is spaced forwardly of the filter 2. The eye 9 of the operator is concentrated on said real image 10a along with a plurality of real images of other photographic objects in the field of view (omitted in the drawings for the sake of clarity) which are respectively focussed in various positions apart from the objective lens 1. Consequently, the refractive power of the crystalline lens 9a of the eye 9 is so adjusted that the real image 10a may be focussed on the retina 9b as a secondary real image 10b. In other words, the positions of the real image 10a and the retina 9b are optically conjugate to each other with respect to crystalline lens 9a.

In this condition, the filter 2 shields only the light of said predetermined wave length range, but does not block the real image 10a from the view of the operator's eye. At the same time, light of said predetermined wave length range, which passes through objective lens 1 and then through the opening 2a of filter 2, enters the operator's eye 9 through an area indicated by the hatch lines which slant downwardly in a right-hand direction in FIG. 1. However, the refractive power of the crystalline lens 9a or eye 9 is in such condition that the positions of the real image 10a and the retina 9b are optically conjugate to each other with respect to said crystalline lens 9a as previously described. Thus, an image of the opening 2a, formed by the light of said predetermined wave length incident thereon, will not be focussed upon the retina 9b of the eye 9, and a blurred image will be received by the retina. The light of said predetermined wave length range is then diffusedly reflected on the retina 9b to thereby follow the reverse direction, being then reflected by the semi-transparent mirror 3 to the aperture 4a of the light shielding plate 4, which aperture 4a is optically equivalent to the opening 2a of filter 2. In this instance, since light passes through an area shown by the hatch lines which slant downwardly in a left-hand direction as viewed in FIG. 1, which area is determined by the refractive power of the crystalline lens 9a, the light will be further blurred upon reaching the light shielding plate 4. Thus, only a part of the light of said predetermined wave length range which has been reflected from the retina 9b and has passed through the crystalline lens 9a will pass through aperture 4a and enter light sensitive member 5. Since the filter 7 shields out the light other than the light of said predetermined wave length range, the light sensitive member 5 is responsive only to the intensity of the light of said predetermined wave length range, so that a corresponding output is produced in the output circuit 6.

On the other hand, where the position of objective lens 1 is so adjusted that a real image 10c of the photographic object 10 is focussed upon the plane of filter 2, as shown in FIG. 2, the refractive power of the crystalline lens 9a of eye 9 is adjusted in such a manner that the real image 10c may be focussed as a secondary real image 10d upon the retina 9b. Thus, an image of the opening 2a, formed by the light of said predetermined wave length range, is focussed upon the retina 9b. Consequently, the light reflecting from the retina 9b all converges into the aperture 4a of the light shielding plate 4, so that the light of said predetermined wave length range, which has been reflected from the retina 9b and passed through the crystalline lens 9a, will all enter the light sensitive member 5, with a corresponding increase in the output of circuit 6.

It will be apparent from the foregoing that the maximum outputs of the output circuit 6, connected to the light sensitive member 5, will result where the real image of the specific photographic object 10 is accurately focussed in the plane of the filter 2 through objective lens 1. Accordingly, if the location of filter 2 is used as a reference plane of objective lens 1, detection of the focal point of objective lens 1, relative to the specific photographic object 10, is achieved with precision in accordance with the outputs from the output circuit. In an actual photographing operation, after the correct focussing has been detected, a film is positioned in the position of the filter 2 to receive an accurately focussed image. As an alternative, a photographic lens of the same focal length as objective lens 1, is shifted in coupled relationship with the lens 1, so that a film is spaced from the photographic lens by a distance equal to the distance between objective lens 1 and filter 2.

Because of a difference in the refractive index between the light of said predetermined wave length range and the visual light, it is possible that, even where the position of the real image of the photographic object 10 is slightly offset from the aforesaid reference plane of focus, namely the plane of filter 2, the outputs of the output circuit 6 may still reach the maximum. This will cause no difficulty if the film setting position is preset to compensate for this discrepancy, as required. The same may be done in each of the embodiments to be presently described.

In the embodiment of FIGS. 1 and 2, if the area of the opening 2a is reduced, and the area of the similar aperture 4a is correspondingly reduced, sensitivity of detection is improved, but the absolute quantity of light received by the light sensitive member 5 will be reduced. To remedy this, a plurality of openings 2a and correspondingly-shaped apertures 4a may be provided, with each aperture and opening being made of reduced area. Thus the total quantity of light entering all of the apertures may be detected by the light sensitive member. As an alternative, in addition to a plurality of openings 2a and corresponding apertures 4a, there may be provided a plurality of light sensitive members, if the design of the optical instrument so dictates.

Figure 3:
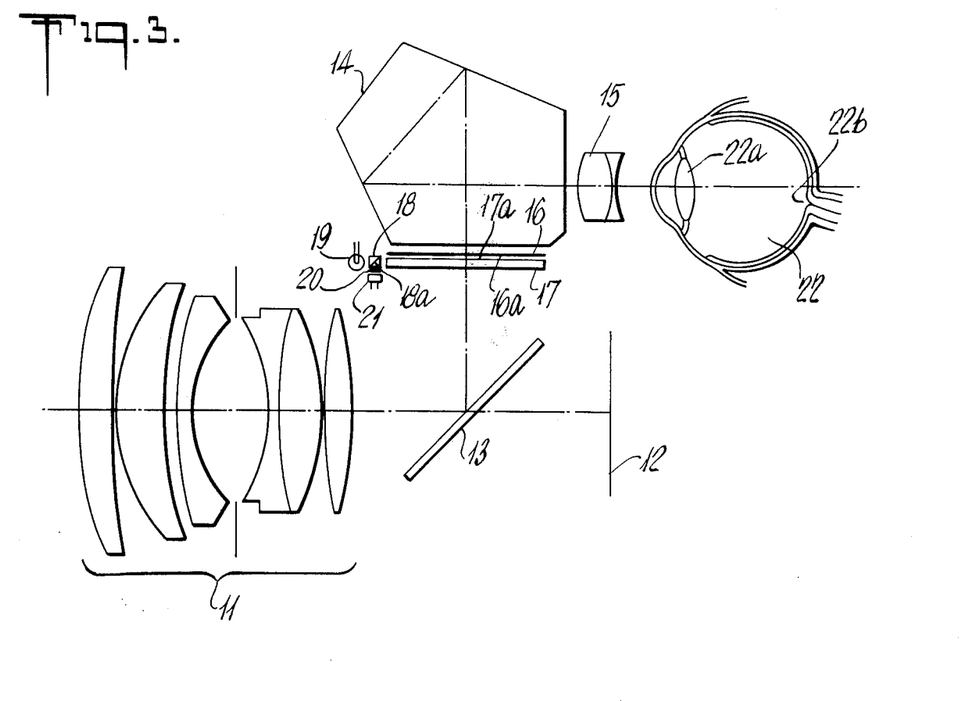
FIG. 3 is a diagrammatical cross-sectional view showing a second embodiment of the present invention.

FIG. 3 illustrates a second embodiment, wherein the detecting device of the present invention is employed for automatic focussing in a single lens reflex camera. The camera includes an objective lens 11 which is shiftable in a horizontal direction, as viewed in FIG. 3, by means of a conventional lens shifting mechanism. Located behind lens 11 is a light sensitive film 12, and a movable mirror 13 is mounted between lens 11 and film 12. In the reflective path of mirror 13 is a pentagonal prism 14, and aligned therewith is an ocular lens 15. The aforementioned components constitute the major part of the optical system of a conventional single lens reflex camera.

Between the mirror 13 and the prism 14 is a filter 16 adapted to shield out light of a predetermined wave length range, for example infra red light, the filter having a central opening 16a which permits passage of light of said range. The filter 16 is located in a line-symmetrical position to the light sensitive film 12 with respect to the movable mirror 13, so that it coincides with the reference plane upon which the image is intended to be focussed. Forwardly of filter 16 is a transparent glass sheet 17 carrying a semi-transparent mirror 17a positioned closely adjacent to the opening 16a of the filter 16. Shown at 18 is a prism having a semi-transparent mirror 18a associated with a light source 19 which emits light of said predetermined wave length range. Shown at 20 is a filter which shields out all light except for light of said predetermined wave length range, and at 21 is a light sensitive member. The operator's eye 22 having a crystalline lens 22a and retina 22b, is brought close to the ocular lens 15, as shown in FIG. 3.

In the operation, the light of said predetermined wave length range is emitted from the light source 19, passes through prism 18, advances through the transparent glass sheet 17, being fully reflected by the inner surfaces of said glass sheet, and is reflected upwardly from the semi-transparent mirror 17a to pass through the opening 16a of filter 16. The light of said predetermined wave length range passing through the aforesaid opening 16a is used in the focussing detection. The aforesaid light is also obtained through the objective lens 11 from the objective field, as in the first embodiment, in addition to the light originated by the light source 19. If such light source may be provided, as in this embodiment, the quantity of light will increase.

The light of said predetermined wave length range which has passed through the opening 16a is reflected on the inner surfaces of pentagonal-prism 14 to enter the operator's eye 22. The light incident upon the operator's eye is further reflected on the retina 22b to follow the reverse direction, and then reaches the filter 16. In the meantime, since the operator's eye is concentrated on a real image of the specific photographic object among a plurality of real images of photographic objects which have passed through the objective lens 11 and have been reflected by the movable mirror 13, the refractive power of the crystalline lens 22a is so adjusted that the position of the real image of the specific photographic object and the position of the real image on the retina 22b are optically conjugate to each other. Thus, as in the first embodiment, the quantity of light of said predetermined wave length range which may pass back through the opening 16a of filter 16, reaches the maximum when the objective lens 11 is adjusted to such a position that the real image of the aforesaid specific photographic object is positioned on the filter 16. The light of said predetermined wave length range which has passed back through the opening 16a is reflected on the semi-transparent mirror 17a, then guided to advance through the transparent glass sheet, being fully reflected by the inner surfaces of the glass sheet, then reflected on the semi-transparent mirror 18a, and enters, via the filter 20, the light sensitive member 21.

Figure 4:
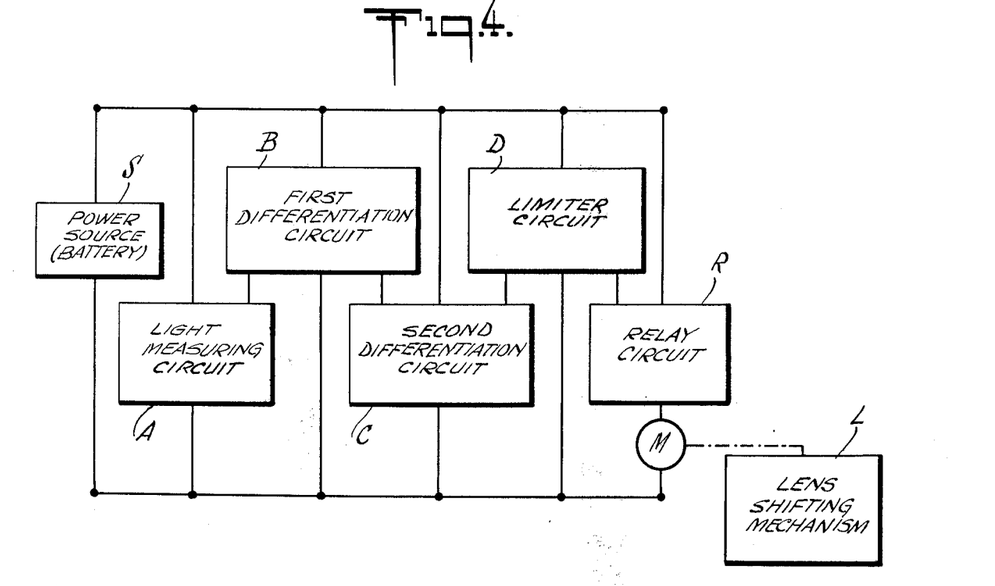
FIG. 4 is a block diagram showing automatic focussing means which may be used in conjunction with the embodiment of FIG. 3.
Figure 5A:
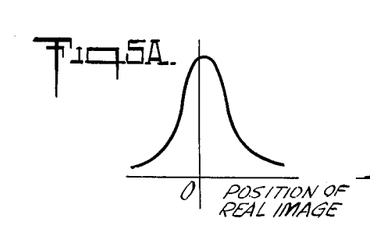
FIGS. 5(A), 5(B), 5(C) and 5(D) are plots showing output characteristics of respective essential parts of the automatic focussing means of FIG. 4.
Figure 5B:
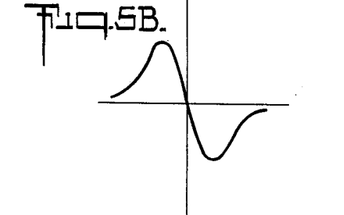
Figure 5C:
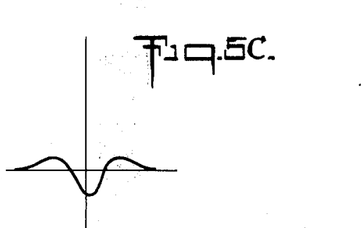
Figure 5D:
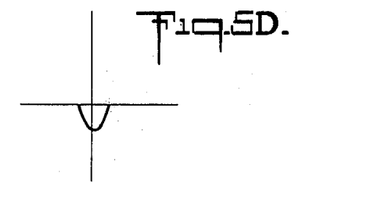

FIG. 4 shows a block diagram of means for automatically operating the objective lens shifting mechanism according to the outputs of the light sensitive member 21 in the embodiment of FIG. 3. A light measuring circuit A is shown in FIG. 4, and includes the aforesaid light sensitive member 21. The relationship of the outputs of the light measuring circuit to the position of the real image of the specific photographic object, on which the operator's eye is concentrated, is shown in the graph of FIG. 5(A). In FIGS. 5(A) to 5(D), each graph ordinate represents an output and the abscissa represents a position of the real image, while a point on the abscissa with which the ordinate intersects, corresponds to the position of the filter 16. The outputs of light measuring circuit A will be the outputs shown in FIG. 5(B) by means of a first differentiation circuit B, and then become the outputs, as shown in FIG. 5(C), of a second differentiation circuit C. The outputs of the second differentiation circuit C are fed as inputs to a limiter circuit D, whereby are obtained the pulse outputs shown in FIG. 5(D). A relay circuit R, to which the outputs of the limiter circuit D are to be fed, is connected to a power sources S in series relation to a motor M for actuating the lens shifting mechanism, so that electric current is fed to the motor M when no pulse is produced, so as to actuate the lens shifting mechanism L to shift the objective lens forwardly or rearwardly of the camera, and the motor is stopped when pulse is fed.

Figure 6:
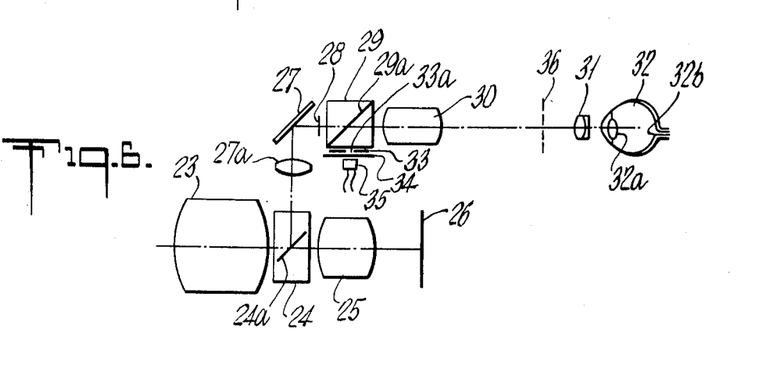
FIG. 6 is a diagrammatical cross-sectional view showing a third embodiment of the invention.

FIG. 6 shows a further embodiment, in which the device of the present invention is incorporated in a single lens reflex motion picture camera. Shown at 23 is a first lens which is movable in a horizontal direction as shown in FIG. 6 for focusing, at 24 a prism having a semi-transparent mirror 24a, and at 25 a second lens. These elements constitute an objective lens, behind which is mounted a light sensitive film 26. In the reflective path of mirror 24a is mounted a mirror 27, and then a small filter 28. Forwardly of mirror 27 is mounted a compensating lens 27a for optically shifting said small filter 28 to a position spaced from the semi-transparent mirror 24a by the same optical distance, as is the film plane 26, so that the small filter 28 is located on the reference plane of focus. The small filter shields out only the light of a predetermined wave length range (for example, infrared light). Shown at 29 is a prism having a semi-transparent mirror 29a, and at 30 an inverting lens. Shown at 31 is an ocular lens, to which the user's eye 32 is brought close, the eye 32 having a crystalline lens 32a and a retina 32b. Associated with prism 29 is a light shielding plate 33 which has an aperture 33a of the same configuration as that of the aforesaid small filter 28, and which is located in such a position that said aperture 33a is in line-symmetrical relation to the small filter 28 with respect to the semi-transparent mirror 29a. Behind plate 33 is a filter 34 for shielding out the light except for light of said predetermined wave length range, which light passes to a light sensitive member 35. Designated 36 is an imaginary secondary reference plane which is assumed in a position optically conjugate to the aforesaid small filter 28 with respect to the inverting lens 30.

In the embodiment of FIG. 6, as described above, if a secondary real image of a specific photographic object formed through the inverting lens 30 is positioned on the secondary reference plane 36, the light of said predetermined wave length range reflected from the retina 32b will not enter the light sensitive member 35, because an image corresponding to a shadow of the small filter 28 is focussed in the aperture 33a of light shielding plate 33. On the other hand, if the position of the aforesaid secondary real image falls off the secondary reference plane 36, the image of said shadow becomes out of focus on the light shielding plate 33. If the image of said shadow is out of focus to a large extent, then the quantity of light incident upon the light sensitive member 35 will increase. In this embodiment the detection of focussing is effected by the use of the minimum value of outputs of the light sensitive member.

The embodiments described so far are of the type in which an image of a confined portion of a filter, or opening therein, is reflected on the retina of the user's eye so as to detect whether or not the reflected light from the retina may converge into the light sensitive portion, thereby detecting whether or not the reference plane and the retina may be optically conjugate to each other with respect to the crystalline lens. The embodiments which will follow are of a different type in which an image on the retina, focussed on a position (outside of the eye) corresponding to the refractive power of the crystalline lens, is used for detecting whether or not the aforesaid retina image is on the reference plane, whereby the aforesaid conjugation will be detected.

Figure 7:
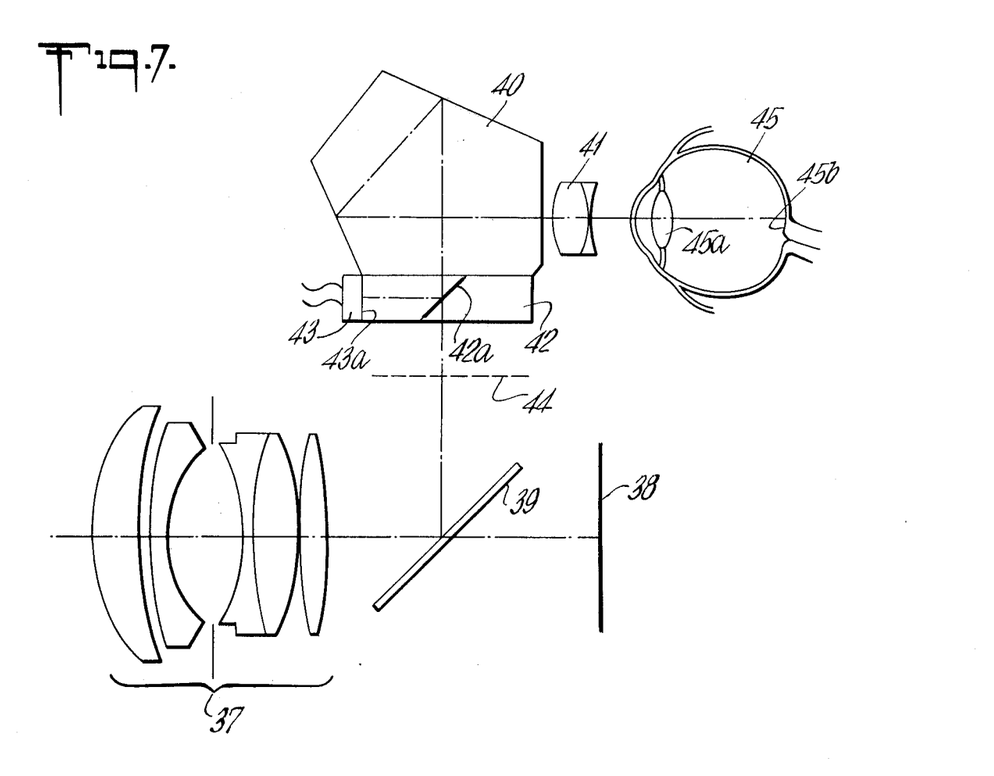
FIG. 7 is a diagrammatical cross-sectional view showing a fourth embodiment of the invention.

In FIG. 7, there is shown an embodiment including an objective lens 37, a light sensitive film plane 38, a movable mirror 39, a pentagonal prism 40, and an ocular lens 41, all of which constitute a major part of the optical system of a known single lens reflex camera. Between mirror 39 and a prism 40 is located a prism 42 having a semi-transparent mirror 42a. Associated with prism 42 is focussing judging means 43 which has a light sensitive plane 43a and functions to detect the focussing of an image to be projected on the aforesaid light sensitive plane 43a. The examples of the focussing judging means of this type are disclosed in various patents such as U.S. Pat. Nos. 2,999,436, 3,495,913, and 3,511,155. The focussing judging means 43 is disposed in such a position that the light sensitive plane 43a thereof is located in a position optically equivalent to an imaginary plane 44 with respect to said semi-transparent mirror 42a, said imaginary plane 44 being intended to be in a line-symmetrical position to the film plane 38 with respect to the movable mirror 39. Designated 45 is an operator's eye which has a crystalline lens 45a and a retina 45b and is brought close to the ocular lens 41.

In operation, the refractive power of the crystalline lens 45a is so adjusted that a real image of a specific photographic object, which is formed through the objective lens, and the retina 45b are optically conjugate to each other with respect to the crystalline lens 45a. Thus, the light which has been directed to the eye 45 through the objective lens 37, is reflected from the retina 45b, and this reflected light passes back through the crystalline lens 45a to form a real image of the retina at a point corresponding to the location of the specific real image. On the other hand, part of the reflected light from the retina is reflected on the semi-transparent mirror 42a and then projected on the light sensitive plane 43a. However, the real image of the retina projected from the retina on the light sensitive plane 43a will be blurred unless the aforesaid specific real image is on the imaginary plane 44. Thus, if the focussing of the retina image formed on the light sensitive plane 43a is detected by said focussing judging means 43, it is possible to determine that a retina-image-forming position is on the light sensitive plane 43a. This also determines that the aforesaid specific real image of the object is formed on the imaginary plane 44 which is opticaly equal to the plane of light sensitive film 38.

Figure 8:
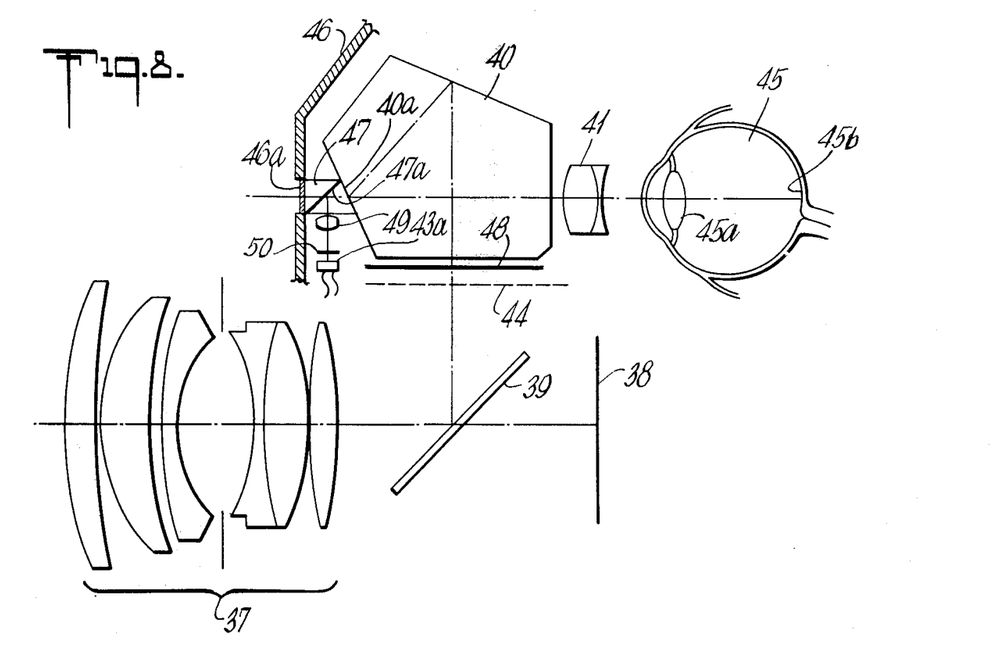
FIG. 8 is a diagrammatical cross-sectional view showing a fifth embodiment of the invention.

FIG. 8 shows an embodiment in which the same optical system as shown in FIG. 7 is provided solely for the purpose of illuminating the retina. Components common to FIGS. 7 and 8 are shown by the identical reference numerals. In this embodiment, there is also provided an outer wall 46 of a camera having a window consisting of a filter 46a for shielding out the light other than light of a predetermined wave length range, the filter 46a being disposed in facing relation to a lighting prism 47 having a semi-transparent mirror surface 47a. Facing the prism 47 is the mated face 40a of the pentagonal prism 40 which is in the form of a semi-transparent mirror, or a dichroic mirror having the characteristic of allowing only the passage of light in said predetermined range. Shown at 48 is a filter for shielding out only the light of said predetermined wave length range, and shown at 49 is a compensating lens, by which the optical length from the crystalline lens 45a to the light sensitive plane 43a of focus judging means 43 is adjusted so as to be equal to the optical length from the crystalline lens 45a to the imaginary reference plane 44. Designated 50 is a filter for shielding out all light other than the light of said predetermined wave length range.

In this embodiment, the light of said predetermined wave length range coming through the filter 46a passes through lighting prism 47 and the pentagonal prism 40 and then illuminates the retina of the eye. It is recommended that infra red light or the like be selected as the light of such predetermined wave length range, so that the operator's eye may not be injured. The retina image formed by the light of said predetermined wave length range is reflected on the semi-transparent mirror 47a to pass through the filter 50, and then projected on the light sensitive plane 43a of focussing judging means 43, thus achieving the focussing detection in the manner as previously described in connection with FIG. 7. On the other hand, the light coming through the objective lens 37 does not reach the light sensitive plane 43a, because the light of said predetermined wave length range is shielded out by the filter 48, while the light other than the light of said predetermined range of wave length is shielded out by the filter 50 or said mated face 40a, and hence the light coming through the objective lens 37 has no influence upon the focussing detection. In this embodiment there may be provided a filter 46a in the upper portion of the outer wall 46 of a camera for incident lighting or otherwise a light source lamp may be provided in facing relation to the filter 46a, without exposing the lighting prism to the outside of the camera.

Although the focussing judging means 43 employed in the embodiments of FIGS. 7 and 8 are of a common type, said means functions to effect focussing detection for a real image of the retina formed by the crystalline lens of the user's eye, rather than detecting the focussing of a real image of the object itself formed through the objective lens 37. Accordingly, what is detected for the proper focussing condition is a single retina having an unchangeable pattern, and hence even if the photographic object changes, detection of focussing is effected under a constant condition, all of the time. Further, focussing detection, with respect to a specific object upon which the operator desires to focus, is accomplished equally as well as in the embodiments in FIGS. 1 to 6.

While there have been described and illustrated preferred embodiments of the present invention, it is apparent that numerous alternations, omissions and additions may be made without departing from the spirit thereof.

I claim:

1. In an optical instrument, a device for detecting focussing conditions comprising:
   an objective lens;
   an imaginary reference plane predetermined at a position optically equal to a plane on which a real image of an object formed by said objective lens is intended to be focussed;
   means for adjusting said objective lens to shift said real image from positions forwardly and rewardly of said reference plane;
   a viewing window positioned to permit the eye of an operator of the instrument to view said real image there through; and
   means for detecting that said reference plane and the retina of said eye of the operator are optically conjugate to each other with respect to the crystalline lens of said eye which views said real image, whereby indirectly detecting that the position of said real image coincides with said reference plane.

2. A device as in claim 1, wherein said detecting means comprises:
   means for projecting light rays of a predetermined range of wave length from at least one small area of said reference plane into the eye of the operator;
   means for receiving the light rays deflected from said retina at a position optically equal to said small area; and
   means for producing an output corresponding to the amount of light received by said receiving means,
   whereby said output producing means presents the maximum output when said reference plane and the retina are optically conjugate to each other with respect to the crystalline lens of said eye.

3. A device as in claim 2, wherein:
   said projecting means comprises a first filter disposed at said reference plane and adapted to selectively filter out light rays of said predetermined range of wave length coming from an objective field, said first filter being provided with at least one small area allowing the passage of light rays of said predetermined range of wave length; and
   said receiving means comprises a semi-transparent mirror disposed between said first filter and said viewing window for deflecting the light rays coming from the retina, a light shielding plate with an opening located and shaped symmetrically to said small area with respect to said semi-transparent mirror for receiving the light rays deflected by said semi-transparent mirror at said opening, a light sensitive member disposed behind said opening and connected to said output producing means, and a second filter disposed between said semi-transparent mirror and said light sensitive member and adapted to filter out light rays of wave lengths outside of said predetermined range.

4. A device as in claim 2, wherein:
   said projecting means comprises a first filter disposed at said reference plane and adapted to selectively filter out light rays of said predetermined range of wave length, said filter being provided with at least one small area allowing the passage of light rays of said predetermined range of wave length, light source means for projecting light rays of said predetermined range of wave length into the eye of the operator through said small area; and
   said receiving means comprises a light sensitive member connected to said producing means, means for guiding the light rays coming from the retina through said small area to said light sensitive member, and a second filter disposed between said guiding means and said light sensitive member and adapted to filter out light rays of wave lengths outside of said predetermined range.

5. A device as in claim 4, wherein said reference plane is determined outside of the path of light rays passed through said objective lens, and said device further comprises a mirror disposed in said path of the light rays which direct said real image toward said reference plane, and a light sensitive film disposed symmetrically to said reference plane with respect to said mirror, said mirror being further movable to retract out of said path of light rays for allowing said real image to be focussed on said light sensitive film.

6. A device as in claim 1, wherein said detecting means comprises:
   a first filter disposed at said reference plane and provided with at least one small area having the characteristic of selectively cutting off light rays of said predetermined range of wave length coming from an objective field:
   a semi-transparent mirror disposed between said first filter and said viewing window for deflecting the light rays coming from the retina;
   a light shielding plate with an opening located and shaped symmetrically to said small area with respect to said semi-transparent mirror for receiving the light rays deflected by said semi-transparent mirror at said opening;
   a light sensitive member disposed behind said opening and connected to said producing means; and
   a second filter disposed between said semi-transparent mirror and said light sensitive member and adapted to filter out light rays of wave lengths outside of said predetermined range.
   whereby said producing means presents the minimum output when said reference plane and the retina are optically conjugate to each other with respect to the crystalline lens of said eye.

7. A device as in claim 6, further comprising a inverting lens for forming a secondary real image of said object, and wherein said viewing window is disposed for the eye of the operator to view said secondary real image and for said light rays from the objective field to travel into the eye through said first filter, said semi-transparent mirror and said inverting lens, whereby said detecting means detects said conjugation between said reference plane and the retina through said inverting lens.

8. A device as in claim 6, wherein said reference plane is determined outside of the path of light rays passed through said objective lens, and said device further comprises a second semi-transparent mirror disposed in said objective lens for directing said real image toward said reference plane, a light sensitive film disposed in said path of light rays, and a compensating lens disposed between said second semi-transparent mirror and said reference plane for optically setting said reference plane at a position optically equal to said light sensitive film with respect to said second semi-transparent mirror.

9. A device as in claim 1, further comprising an ocular lens disposed at said viewing window, whereby said detecting means detects said conjugation between said reference plane and the retina through said ocular lens.

10. A device as in claim 1, wherein said detecting means comprises a light receiving plane disposed at a position optically equal to said reference plane so as to be projected with a real image of the retina formed by the crystalline lens of said eye, and means for judging that said real image of the retina is focussed on said light receiving plane.

11. A device as in claim 10, wherein said detecting means further comprises means for illuminating the retina with light rays of said predetermined range of wave length, and a filter disposed in front of said light receiving plane and being adapted to filter out light rays of wave lengths outside of said predetermined range.

12. A device as in claim 10, wherein said light receiving plane is located outside of the path of light rays defined between said reference plane and the retina, and said detecting means further comprises a semi-transparent mirror disposed in said path of light for introducing light rays coming from said retina to said light receiving plane.

13. A device as in claim 12, wherein said detecting means further comprises a compensating lens disposed between said semi-transparent mirror and said light receiving plane for optically setting said light receiving plane at a position optically equal to said reference plane with respect to said semi-transparent mirror.

14. A device as in claim 1, further comprising means for automatically controlling said adjusting means, said controlling means being so related to said detecting means as to stop said shift of the real image when said detecting means detects said conjugation between said reference plane and the retina.

* * * * *

UNITED STATES PATENT OFFICE
CERTIFICATE OF CORRECTION

Patent No. 3,936,849   Dated February 3, 1975

Inventor(s) Kayoshi Tsujimoto

It is certified that error appears in the above-identified patent and that said Letters Patent are hereby corrected as shown below:

--[45]  Feb. 3, 1976--

Signed and Sealed this first Day of June 1976

[SEAL]

Attest:

RUTH C. MASON
Attesting Officer

C. MARSHALL DANN
Commissioner of Patents and Trademarks